US012729167B2

(12) United States Patent
Merrell et al.

(10) Patent No.: US 12,729,167 B2
(45) Date of Patent: Sep. 8, 2026

(54) SYSTEMS, METHODS, AND APPARATUS FOR CONVERTING A BIOSOLID TO AN ENHANCED CYLINDRICAL CLASS A FERTILIZER

(71) Applicant: Merrell Bros., Inc., Kokomo, IN (US)

(72) Inventors: Ted Merrell, Kokomo, IN (US); Terry Merrell, Kokomo, IN (US); Addison Lopp, LaFontaine, IN (US)

(73) Assignee: MB Holding Company, Inc., Kokomo, IN (US)

( * ) Notice: Subject to any disclaimer, the term of this patent is extended or adjusted under 35 U.S.C. 154(b) by 993 days.

(21) Appl. No.: 17/831,481

(22) Filed: Jun. 3, 2022

(65) Prior Publication Data

US 2023/0257320 A1 Aug. 17, 2023

Related U.S. Application Data

(60) Provisional application No. 63/310,628, filed on Feb. 16, 2022.

(51) Int. Cl.
*C05F 3/06* (2006.01)
*B65B 1/32* (2006.01)
(Continued)

(52) U.S. Cl.
CPC .............. *C05F 17/957* (2020.01); *B65B 1/32* (2013.01); *B65B 11/585* (2013.01); *C05F 17/993* (2020.01); *C05G 5/10* (2020.02)

(58) Field of Classification Search
CPC ........................................................ C05F 3/06
See application file for complete search history.

(56) References Cited

U.S. PATENT DOCUMENTS 4,043,047 A 8/1977 Galliker
4,121,539 A 10/1978 Moore
(Continued)

FOREIGN PATENT DOCUMENTS

CN 2727147 Y 9/2005
CN 2752690 Y 1/2006
(Continued)

OTHER PUBLICATIONS

Adams Fertilizer Equipment. Wayback screen capture from Oct. 8, 2018 (Year: 2018).*
(Continued)

*Primary Examiner* — Donald R Spamer
(74) *Attorney, Agent, or Firm* — FisherBroyles, LLP

(57) ABSTRACT

This invention discloses and claims a system comprising greenhouses for receiving biosolids comprising a heated slab and an odor control system; a pasteurization building to receive the biosolids from the greenhouse, at least one pasteurization system comprising heat up belts, a burner fan to heat the biosolids, a pasteurization belt to convey the biosolids through a pasteurization chamber; holding tanks to receive the biosolids and enhancement storage to hold enhancements, a scale and a blender to blend the biosolids with the one or more enhancements, a pellet mill to receive a blended fertilizer, the pellet mill comprising a die to form the blended fertilizer into a pellet and a knife to cut the pellet to a desired length, wherein the pellet mill further comprises a temperature-controlled die operable to control the temperature of the blended fertilizer to promote the formation of the pellets.

20 Claims, 8 Drawing Sheets

(51) Int. Cl.

| | |
|---|---|
| ***B65B 11/58*** | (2006.01) |
| ***C05F 17/957*** | (2020.01) |
| ***C05F 17/993*** | (2020.01) |
| ***C05G 5/10*** | (2020.01) |

(56) References Cited

U.S. PATENT DOCUMENTS

| | | | | |
|---|---|---|---|---|
| 4,174,371 | A | 11/1979 | Bell | |
| 4,255,389 | A | 3/1981 | Jung | |
| 5,085,175 | A * | 2/1992 | Clements, Jr. | A01K 1/0152 119/171 |
| 5,361,708 | A | 11/1994 | Barnes | |
| 5,853,590 | A | 12/1998 | Burnham | |
| 6,103,191 | A | 8/2000 | Luker | |
| 6,243,968 | B1 | 6/2001 | Conrad | |
| 7,240,440 | B2 | 7/2007 | Delons | |
| 7,434,332 | B2 | 10/2008 | Morton | |
| 8,124,401 | B2 | 2/2012 | Dutil | |
| 8,202,342 | B2 | 6/2012 | Burnham | |
| 8,468,714 | B2 | 6/2013 | Conrad | |
| 8,491,693 | B2 | 7/2013 | Burnham | |
| 8,617,285 | B2 | 12/2013 | Culp | |
| 8,926,791 | B2 | 1/2015 | Hammond | |
| 9,573,854 | B2 | 2/2017 | Culp | |
| 9,751,813 | B2 | 9/2017 | Merrell | |
| 10,259,755 | B2 | 4/2019 | Merrell | |
| 10,551,060 | B2 | 2/2020 | Berberoglu | |
| 2003/0126898 | A1* | 7/2003 | You | C05F 1/00 71/11 |
| 2005/0028680 | A1 | 2/2005 | Thompson | |
| 2009/0064569 | A1* | 3/2009 | Khater | B30B 11/228 44/589 |
| 2011/0159576 | A1 | 6/2011 | Arnold | |
| 2012/0074057 | A1 | 3/2012 | Kovalak | |
| 2013/0146533 | A1 | 6/2013 | Arnoldsen | |
| 2013/0333236 | A1 | 12/2013 | Grosser | |
| 2014/0144195 | A1 | 5/2014 | Callendrello | |
| 2015/0353435 | A1* | 12/2015 | Merrell | C05F 7/00 422/291 |
| 2016/0159691 | A1* | 6/2016 | Kercher | B01F 29/83 264/117 |
| 2016/0168042 | A1* | 6/2016 | Tironi Gallardo | C05B 17/00 71/27 |
| 2016/0355443 | A1* | 12/2016 | Burnham | C05C 9/02 |
| 2025/0223212 | A1* | 7/2025 | Klittich | C02F 11/13 |

FOREIGN PATENT DOCUMENTS

| | | | |
|---|---|---|---|
| CN | 201217645 | Y | 4/2009 |
| CN | 201809266 | U | 4/2011 |
| CN | 102643007 | A | 8/2012 |
| CN | 10276864 | A | 11/2012 |
| CN | 202610086 | U | 12/2012 |
| CN | 202829795 | U | 3/2013 |
| CN | 103359904 | A | 10/2013 |
| CN | 104014580 | A | 9/2014 |
| DE | 20304220 | U1 | 5/2003 |
| DE | 202006008137 | U1 | 11/2006 |
| DE | 102011018279 | A1 | 10/2012 |
| EP | 2013148 | B1 | 12/2011 |
| EP | 1644679 | B1 | 4/2012 |
| EP | 1464628 | B1 | 10/2012 |
| FR | 2927693 | A1 | 8/2009 |
| KR | 20110100688 | A | 9/2011 |
| RU | 2111938 | C1 | 5/1998 |
| WO | 2004020922 | A1 | 3/2004 |

OTHER PUBLICATIONS

English Translation of Suzuki JP H05194071 (Year: 1993).*

SolarOrganite.https://web.archive.org/save/_embed/https://sites.google.com/site/solarorganite/home> pp. 1-8 (May 27, 2013).

IDS filed on Jun. 3, 2015 in U.S. Appl. No. 14/729,860, now U.S. Pat. No. 9,751,813.

Bennamoun, L., "Solar drying of wastewater sludge: A review." Renewable and Sustainable Energy Reviews; 2012; pp. 1061-1073; vol. 16; Elsevier Ltd., Algeria (13 pages).

Slim, R., et al., "Modeling of a solar and heat pump sludge drying system," International Journal of Refrigeration; 2008; pp. 1156-1168; vol. 31, Elsevier Ltd. and IIR; France (13 pages).

Salihoglu et al., "Solar drying in sludge management in Turkey," Renewable Energy; 2007; pp. 166i-1675; vol. 32; Elsevier Ltd., Turkey (14 pages).

Romdhana, M. H. et al, "Monitoring of pathogenic microorganisms contamination during heat drying process of sewage sludge," Process Safety and Environmental Protection; 2009; pp. 377-386; vol. 87; Elsevier B.V.; France ("10 pages).

Seginer, I. et al, "Modeling Solar Drying Rate of Wastewater Sludge," Drying Technology: An International Journal; 2006; pp. 1353-1363; vol. 24; Taylor & Francis Group, L.LC; Israel (12 pages).

Mathioudakis, V.L ET /-1L, "Extended Dewatering of Sewage Sludge in Solar Drying Plants," Desalination; 2009; pp. 733-739; vol. 248, Elsevier B.V., Greece (7 pages).

Luboschik, U., "Solar Sludge Drying—Based on the IST Process," Renewable Energy: 1999; pp. 785-788; vol. 16; Elsevier Science Ltd.; Germany (14 pages).

Seginer, i. et al, "Optimal Control of Soiar Sludge Dryers," Drying Technology, 2007; pp. 40"1-415; vol. 25; Taylor & Francis Group, LLC; Israel (16 pages).

Bux, M. et al., "Class-A by Solar Drying Recent Experiences in Europe," Proceedings of the Water Environment Federation, WEFTEC 2001: Sessions 41-50; pp. 309-317; Germany (9 pages).

Lei, Z. et al., "Sewage Sludge Soiar Drying Practise and Characteristics Study," Asia-Pacific Power and Energy Engineenng Conference; 2009; pp. 1-5; IEE Explore; China (5 pages).

Zwiefelhofer, Hans P., "Aerobic-thermophiiic/anaerobic-rnesophiiic two-stage sewage sludge treatment: Practical experiences in Switzerland," Conservation & Recycling; 1985; pp. 285-301, vol. 8, No. 1/2; Pergamon Press Ltd., Great Britain ( 17 pages).

Hudson, J.A et al., "Current Technologies for Sludge Treatment and Disposal," Water and Environmental Journal; Dec. 1996; pp. 136-441; vol. 10; Wiley; United Kingdom (6 pages).

* cited by examiner

SYSTEMS, METHODS, AND APPARATUS FOR CONVERTING A BIOSOLID TO AN ENHANCED CYLINDRICAL CLASS A FERTILIZER

PRIORITY CLAIM

This application claims priority to provisional patent application Ser. No. 63/310,628 filed on Feb. 16, 2022, the content of which is incorporated herein by reference.

BACKGROUND OF THE INVENTION

This application claims improvements to systems and methods for converting a biosolid to class A fertilizer as disclosed and claimed in U.S. Pat. Nos. 9,751,813 and 10,259,755, the entire content of which are incorporated herein by reference. Biosolids are the solid, semisolid, or liquid residue generated during the biological wastewater treatment process. Biosolids for beneficial use (i.e., land application, marketing, or distribution) must be treated to reduce pathogens and vector attraction ("VAR"). The improvements disclosed and claimed comprise using hydronic floor heating in the greenhouse, tillage of the biosolids, and creating cylindrical pellets of class A fertilizer that may contain one or more enhancements.

Insects, birds, rodents, and domestic animals may transport sewage sludge and pathogens from sewage sludge to humans. Vectors are attracted to sewage sludge as a food source, and the reduction of the attraction of vectors to sewage sludge to prevent the spread of pathogens is a focus of federal regulation. VAR can be accomplished in two ways: by treating the sewage sludge to the point at which vectors will no longer be attracted to the sewage sludge or by placing a barrier between the sewage sludge and vectors.

After the treatment of wastewater is performed, the sludge (biosolids) is generated and needs to be treated or discarded. Biosolids are hauled from wastewater treatment plants and reused in rural farm areas where the biosolids may be applied to farm fields or transported to a landfill for disposal. Wastewater sludge is mostly water. Large volumes are created, requiring costly transportation for disposal of what is mostly just water. The sludge also can create environmental problems and health problems.

Federal, state, and local governments regulate the distribution and marketing of Class A biosolids. Class A biosolids represent the highest quality biosolids produced and may be used as fertilizer through commercial distribution and marketing. To achieve a Class A status, the biosolids must be treated to a level that substantially eliminates pathogens and meets strict parameter concentration limits for heavy metals. Class A biosolids may be distributed in bulk or bagged for sale at retail centers. Class A biosolids may be marketed in different physical forms, and, like traditional commercial fertilizer, are not subject to site management restrictions if the product is registered as a fertilizer or distributed and marketed to a person or entity that will sell or give-away the biosolids or biosolids products as a fertilizer.

The United States Environmental Protection Agency's (EPA) Regulations recognize at least two classes. Class B pathogen reduction standards, as set forth in 40 CFR 503, require a fecal coliform level of less than two million most-probable-number (MPN) per gram of total solids. Class A pathogen standards, per (40 CFR 503) require fecal coliform densities are less than 1,000 MPN per gram total solids; or when *Salmonella* densities are less than 3 MPN per four grams total solids. Additionally, enteric virus must be less than 1 plaque-forming unit per four grams of total solids, and helminth ova must be less than one viable helminth ova per four grams of total solids.

Traditionally, biosolids (sludge) disposal involves trucking the sludge to rural areas and applying the sludge onto fields. This may cause major health concerns. Other methods of disposal may include incineration, adding chemicals, or disposal into landfills. Concerns about contaminants, runoff, air pollution, tipping fees, and rising transportation costs have resulted in cities and municipalities seeking alternative and more efficient methods to manage the removal of biosolids.

SUMMARY OF THE INVENTION

This invention involves systems and methods for greenhouse pre-drying of the biosolids followed by controlled pasteurization to create a Class A fertilizer. In one preferred embodiment, a greenhouse contains the biosolids to pre-dry. The desired pre-drying level is within the range of about 60 to about 70% solids (30-40% moisture) by weight. After pre-drying, the biosolids enter a fueled pasteurization system. The function of the fueled pasteurization system is twofold. First, it raises the temperature of the biosolids from ambient temperature to a minimum of 70° C. Second, it decreases the moisture content (increase the solids content) of the biosolids to meet or exceed 75% solids. Once the biosolids reaches 70° C. or higher, the belt pasteurization chamber maintains the biosolids at that temperature for at least thirty (30) minutes. The pasteurization system then discharges the biosolids to a container. The finished product meets the highest level of treatment requirements of Class A as defined by the EPA Regulations Part 503 Process to Further Reduce Pathogens ("PFRP") for Pasteurization of the biosolids to destroy pathogens and by increasing the solids content above 75% to achieve the required VAR to meet the requirements for Class A biosolids. The resulting fertilizer product is then pelletized with or without additional nutrients.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
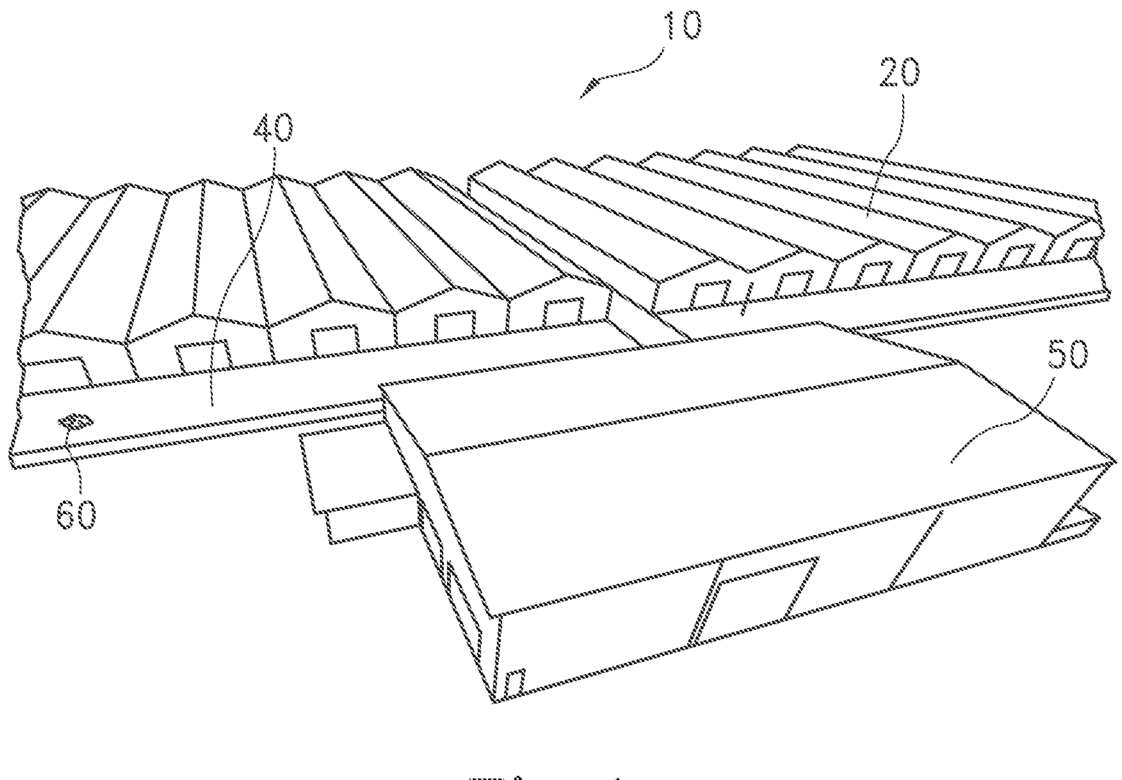
FIG. 1 shows a perspective view of the greenhouses and the pasteurization building.

The following detailed description provides contemplated modes of conducting embodiments of the invention. The description is not to be taken in a limited sense but to be made for the purpose of illustrating the general principle of the invention since the scope of the invention is best defined as seen below. For the purposes of promoting an understanding of the principles of the invention, reference is made to the embodiments illustrated in the drawings and specific language describes the same. No limitation of the scope of the invention is intended. Alterations, modifications, and differing applications as illustrated therein as would occur to one skilled in the art to which the invention relates are contemplated.

Greenhouse drying is used throughout the United States and the world to further dry biosolids and to reduce volumes. Reducing the total volume of product helps to reduce the transportation costs. Greenhouse drying alone does not allow for biosolids to achieve high enough temperatures to achieve Class A or AA standards as defined by the EPA regulations for pasteurization. Adding the pasteurization process, using a natural gas, LP, other forms of fuel or electrically heated oven, completes the desired results of producing an economical, pasteurized final product 210 that can have a beneficial use.

Figure 4:
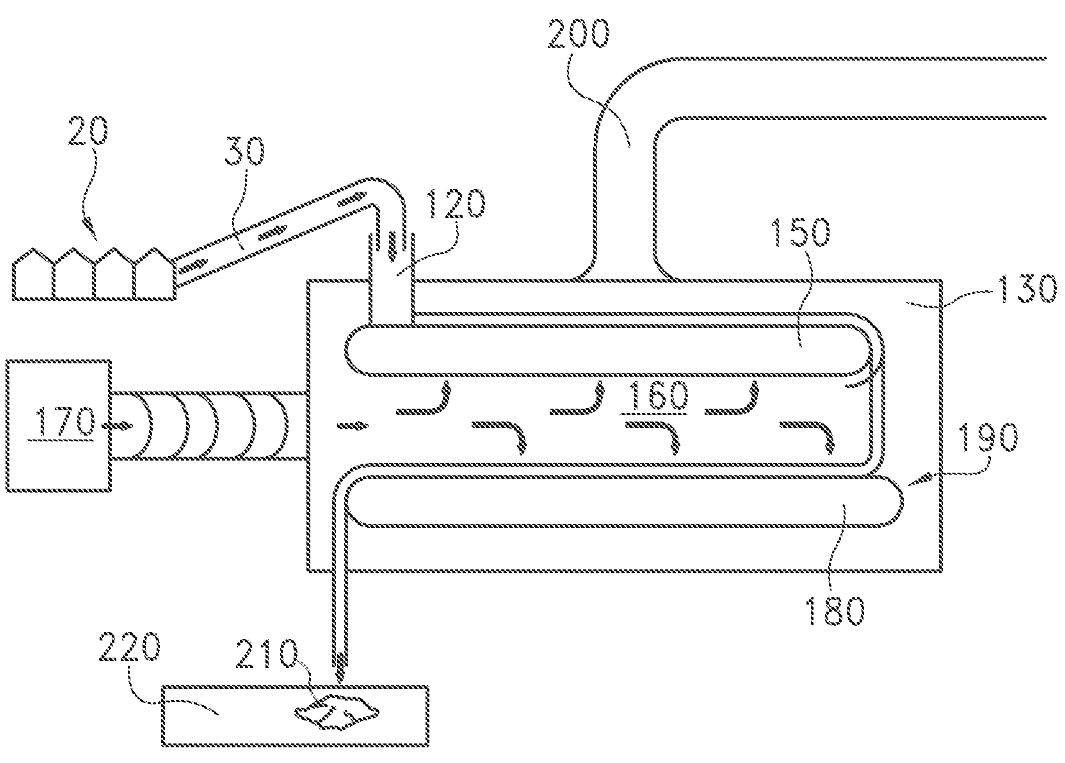
FIG. 4 shows a cross-section of the pasteurization system.
Figure 5:
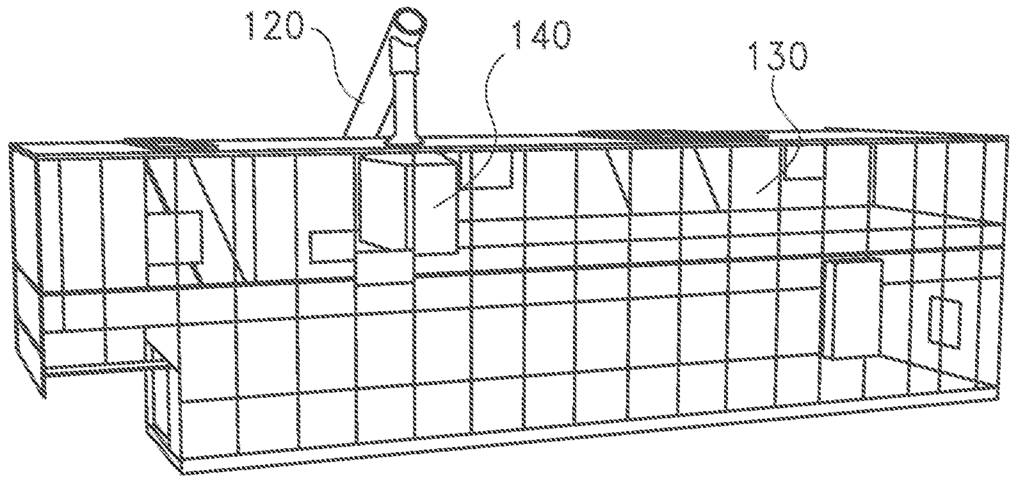
FIG. 5 shows a cross-section of an embodiment with the pasteurizer having a storage hopper.

Referring to FIG. 1, a greenhouse 20 holds the biosolids 30 (FIG. 2) upon arrival at the treatment complex 10. A biofilter system 40 operates with the greenhouse 20 to reduce odors. A pasteurization building 50 contains the pasteurization system 130 (FIGS. 4 & 5). Odor control can be managed using media bed 60 such as a woody mulch material designed into a biofilter system 40. The biofilter system 40 may include a forced air duct distribution system 75 (shown in FIG. 3) that discharges the air into an air plume underneath a bed of woody media material. Carbon in the media bed 60 creates an environment for microbes to thrive and thus there is a degradation of the absorbed odorous compounds to renew the absorptive capacity of the media. The media bed 60 may be open to the environment, covered, or enclosed for a stack discharge Other odor control systems such as packed-tower wet scrubbers, fine-mist wet scrubbers, activated carbon absorbers and thermal oxidizers may also be used. The basis for packed-tower wet scrubbers is the induction of intimate contact between the contaminant odorous air and a scrubbing solution, causing a mass transfer between the two media in which contaminant molecules are absorbed into the liquid. Fine-mist wet scrubbers treat odor by bringing the air in contact with 10 micron-sized droplets of scrubber solution generally produced through atomizers using compressed air. Activated carbon absorbers possesses a high surface area per unit weight, an intricate pore structure and a primarily hydrophobic surface. Thermal oxidation systems oxidize organic compounds into carbon dioxide and water vapor.

Figure 2:
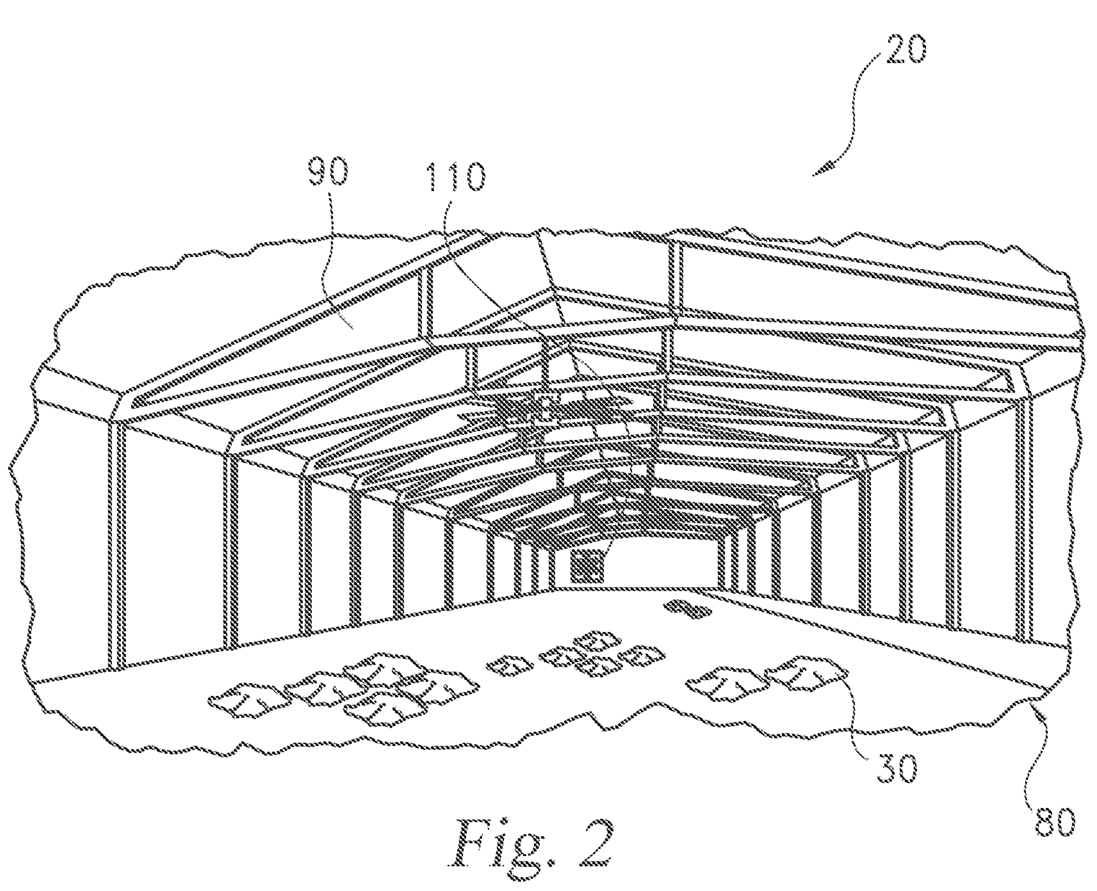
FIG. 2 shows an interior view of a greenhouse containing biosolids.

Referring to FIG. 2, the biosolids 30 are distributed within the greenhouse 20 to pre-dry the biosolids 30 to a desired level. The desired level of pre-drying is between 60 to 70% solids (30 to 40% moisture) by weight. Pre-drying to levels below or above this target range can still be operable but will require additional handling to avoid biosolids 30 that are too wet or too dry for the treatment complex 10. This pre-drying reduces the volume of material that enters the pasteurization building 50 (FIG. 1) to increase the efficiency of the pasteurization process. Circulation fans no may be positioned throughout the greenhouse 20.

The greenhouse 20 allows for the biosolids 30 to be placed on the floor 80 to maximize the surface area of exposure to sunlight through a clear cover 90. Glass, polycarbonate, or other suitable materials such as Lexan suffice for the clear cover 90.

Figure 3:
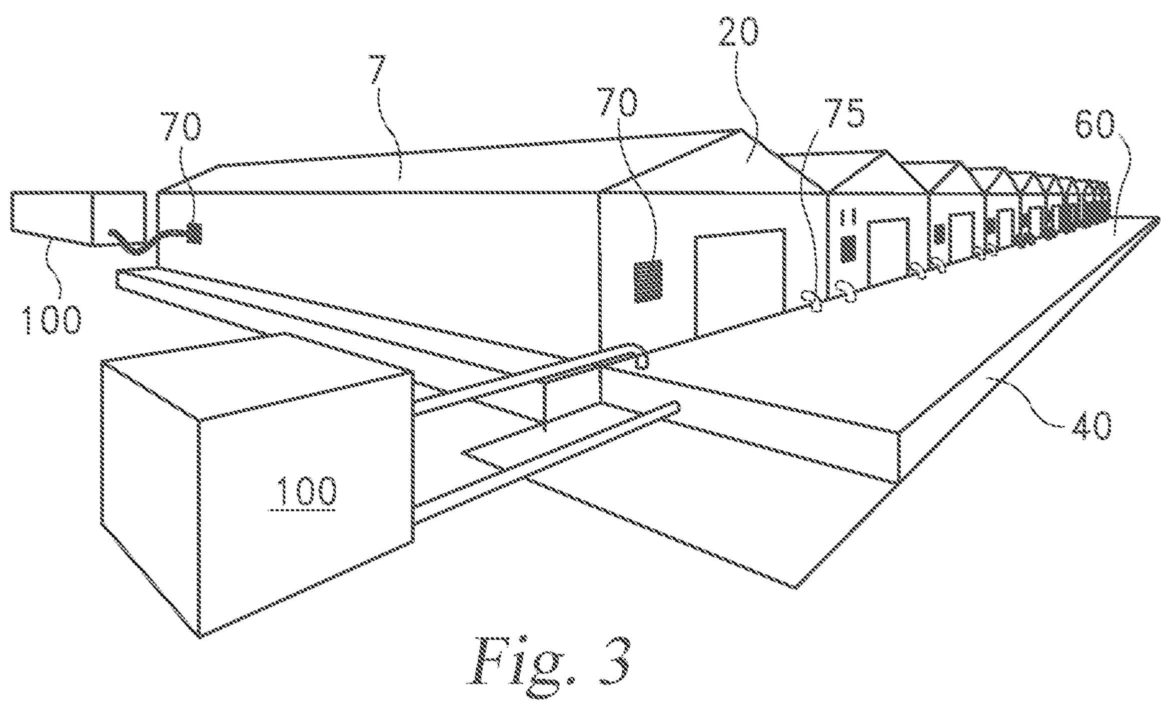
FIG. 3 shows an exterior view of the greenhouse with air inlets for ventilation control and an odor control biofilter system.

FIG. 3 shows a perspective view of the greenhouse 20 having vents 70 for controlling airflow and temperature within the greenhouse 20. The greenhouse 20 can also be equipped with air handlers/exchangers 100 to maximize the vaporization of water from the biosolids 30 (FIG. 2). The air handlers 100 may be operably connected with the biofilter system 40. The air handlers 100 may be local or remote. Vents 70 may be manual or may be automated to achieve the desired number of air exchanges within the greenhouse 20. Selective control of the vents 70 impacts the drying rate of the biosolids 30 (FIG. 2) by removing the high moisture air out through an exhaust fan 75 to the biofilter system 40 and introducing fresher, lower humidity air that may absorb additional moisture from the biosolids 30 (FIG. 2). In one embodiment air enters vents 70 and exits at exhaust fans 75 at the other end of the greenhouse 20.

Air circulation within the greenhouses can be also accomplished with circulation fans 110 (FIG. 2) that keep the hot moist air moving throughout the greenhouse 20 until such time as it is exchanged using the exhaust fans 75 and the biofilter system 40. The air handlers 100 can also circulate air to and from the biofilter system 40. Alternatively, the air handlers 100 may either work as heat exchangers or coolers depending on the desired effect. The air circulation may be manual or automated depending on the humidity levels contained within the greenhouse 20. Generally, the greater the air circulation the greater the pre-drying performance. The air can be transferred through exhaust fans 75 into a biofilter system 40 to remove odorous emissions.

The biosolids 30 (FIG. 2) can be mechanically turned at select time intervals to allow moist biosolids 30 to be exposed to air and the solar sunlight for the drying process. The pre-drying process continues until the biosolids 30 reach a desired dryness, e.g., 60% to 70% solids (30% to 40% moisture) by weight. With increased air handling and management, this range could be widened to 50% to 80% solids (20% to 50% moisture).

Referring to FIG. 4, after pre-drying, the biosolids 30 are conveyed into the pasteurization building 50 (FIG. 1). An inlet 120, accepts biosolids 30 from the greenhouse 20. The biosolids 30 are conveyed without crushing or pulverizing the biosolids 30. The biosolids 30 can be fed into a pasteurization system 130 or the biosolids 30 can be transferred into a storage hopper 140 (FIG. 5) before being fed to the pasteurization system 130. Hopper 140 may be a tank, bin, bunker, or other similar vessel suitable for storing biosolids 30.

The pasteurization building 50 (FIG. 1) houses the pasteurization system 130. The pasteurization system 130 includes at least two woven belts 150, 180 that are porous to allow hot air or gas 160 to pass through the belts and thus through the biosolids that is traveling on the belts. The heat up belt 150 raises the temperature of the biosolids 30 from ambient temperature to at least 70° C. The heat up belt 150 receives the biosolids 30 at a controlled even depth, provided by an adjustable level gate. The heat up belt 150 carries the biosolids 30 as the heated gas 160 passes through the heat up belt 150 and the biosolids 30. The heated gas 160 raises the temperature of the biosolids 30 from ambient temperature to a minimum of 70° C. as the biosolids 30 travels across the heat up belt 150. The speed of the heat up belt 150 can be manually or automatically controlled to assure that the desired end temperature of the biosolids 30 is achieved by the time the biosolids 30 finishes its journey through on the heat up belt 150. During this heat up process, the biosolids 30 lose moisture to achieve the desired rise in the solids content to achieve the VAR requirement goal of a minimum of 75% solids. The heat up belt 150 may have a variable speed control to ensure the biosolids remain at the desired temperature for the desired time.

A burner fan 170 provides heat (hot air or hot gas) to the pasteurization system 130 and heat up belt 150 to raise the temperature of the biosolids 30 to a desired temperature. The burner fan 170 may comprise any type of heat exchanger capable of producing the BTU's necessary to achieve the desired temperature of the heated gas 160. The burner fan 170 can be fueled with natural gas, propane, liquid petroleum, digester gas, landfill gas, methane gas, electricity, or any other fuel source capable of producing the necessary BTU's.

Once the desired temperature has been reached on the heat up belt 150, the biosolids 30 transfer to the pasteurization belt 180. The pasteurization belt 180 conveys the biosolids through the pasteurization chamber 190 for a minimum of 30 minutes at a temperature of at least 70° C. The pasteurization belt 180 comprises a woven porous material to allow heated gas 160 to pass through the pasteurization belt 180 and thus pass through the biosolids 30.

The heated gas 160 passes through the heat up belt 150, the pasteurization belt 180, and biosolids 30 by being drawn through the belts and the biosolids by an exhaust blower 200. The exhaust blower 200 can either be open vented or it can be cyclone vented to allow for the capture of fine dust particles. The exhaust air may also be passed through a biofilter system 40 (FIGS. 1 & 3) to capture odors that may be produced in the pasteurization process. The heated gas 160 passing through the pasteurization chamber 190 may be manually controlled or it may be automated to achieve the desired goal of maintaining at least 30 minutes of at least 70° C. The pasteurized biosolids 210 can then be shipped in bulk or be bagged for beneficial reuse.

The present invention adds more rapid drying of biosolids 30 than can be provided by greenhouse drying alone and provides heat and proper levels of temperatures that exceed US EPA Pasteurization requirements more energy efficiently than thermal drying alone. The pasteurization chamber 190 works well with high volume biosolids 30. The resulting, pasteurized biosolids 210 are then discharged from the pasteurization chamber 210 into storage 220.

In one embodiment, there are two pods of greenhouses 20 measuring 294 feet wide by 214 feet long. Each pod consists of seven greenhouses 20 that are connected side by side and open throughout the connecting (214 feet long) sides. Each greenhouse 20 unit is 42 feet wide by 214 feet long. At the end of each greenhouse 20, a 20 foot by 20-foot vacant space for equipment resulting in 40 square feet of each greenhouse section being unavailable for drying. The usable area of each greenhouse 20 is 174 feet long by 42 feet wide or 7,308 square feet. As a person of ordinary skill in the art will appreciate, the dimensions of the greenhouses 20 may vary without departing from the scope of the claimed invention.

Tilling the biosolids 30 on the greenhouse floor 80 may be performed one or more times each day. The tillage homogenizes and breaks up the biosolids 30 to allow moist material closer to the slab 260 to be exposed to the air flowing across the greenhouse 20. Other greenhouse drying systems utilize an automated electric 'mole' or track mounted shafts that are more costly and complicated. A tractor (not shown) with a 10' tillage implement is driven two turns (comprising a trip down and back) around each 42' bay at least once per day.

Additionally, at least once during each drying cycle, the biosolids 30 may be stockpiled to homogenize the biosolids 30 and allow the slab 260 to dry before redeposition of the biosolids 30 and completion of the drying cycle. This serves to homogenize biosolids 30 deposited in different areas that may have slightly different ages and moisture levels.

Figure 6:
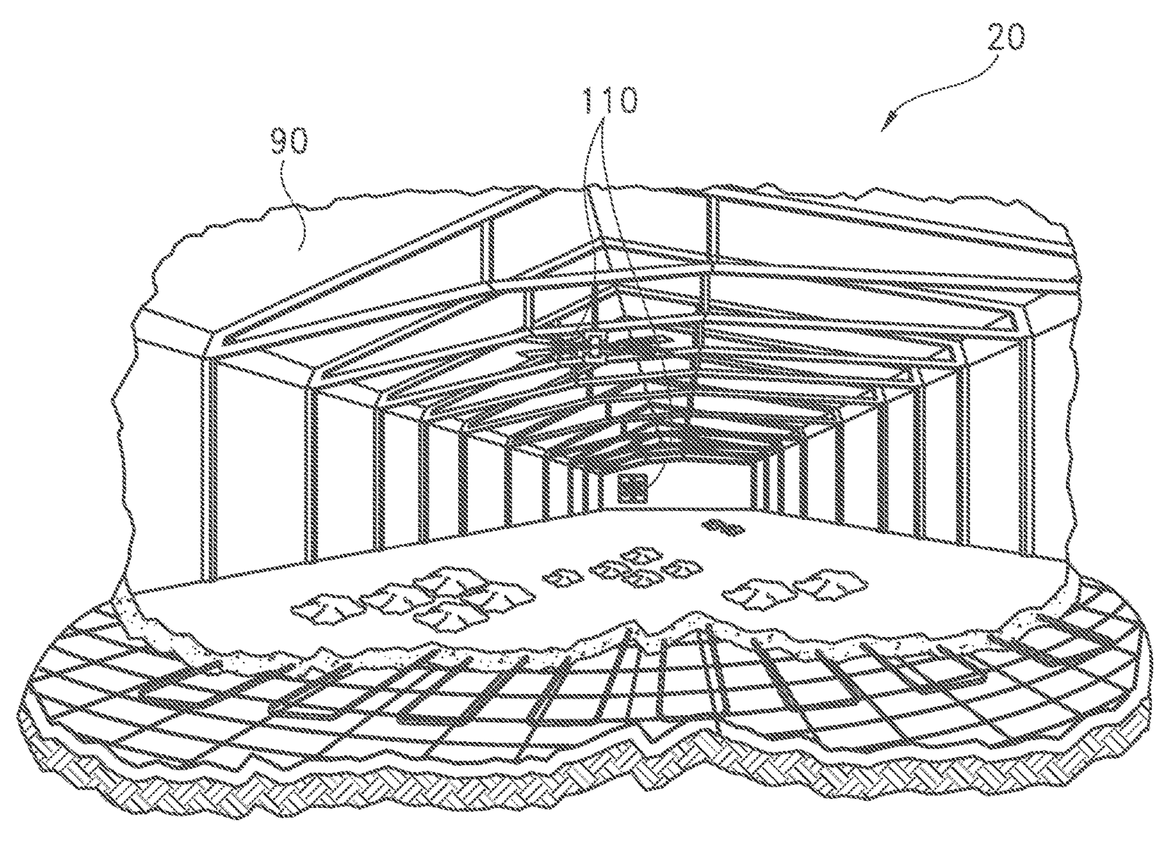
FIG. 6 shows a slab illustrating the hydronic floor heating.
Figure 7:
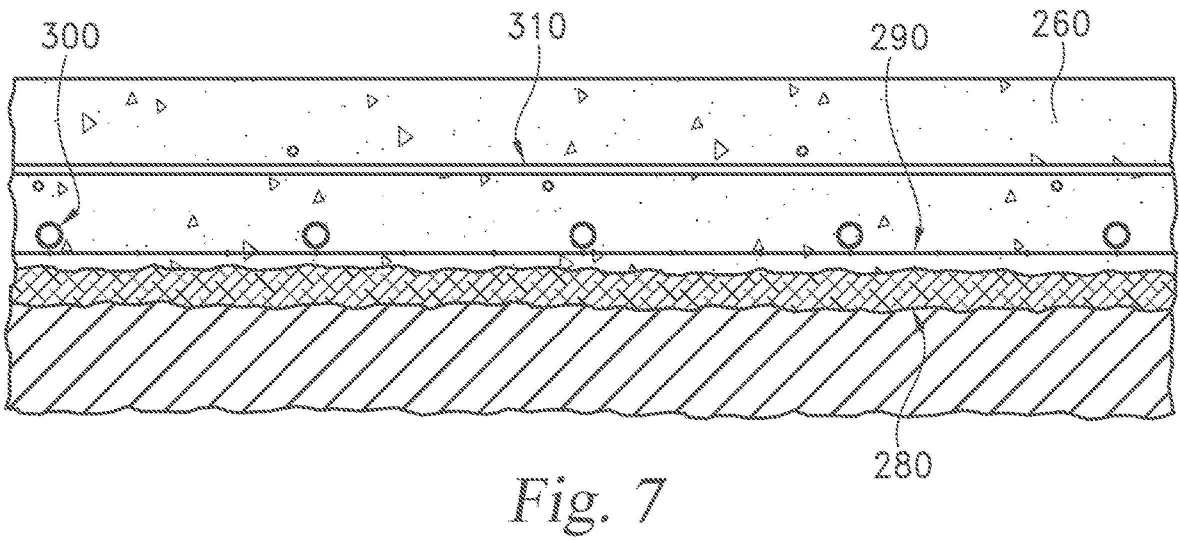
FIG. 7 shows a cross section of the slab with hydronic heating system.

In a preferred embodiment, referring to FIG. 6, a hydronic floor heating system (FIG. 8) may be integrated into the reinforced concrete slab 260 for the greenhouses 20. The hydronic floor heating system (FIG. 8) consists of an insulation/vapor barrier 280. A flexible tubing 300 is positioned in the slab 260. A welded wire fabric (WWF) 290 or similar is placed on top of the vapor barrier 280 to weigh down flexible tubing 300 and provide a framework for the flexible tubing 300 to be routed and secured circuitously. A steel rebar reinforcement mat 310 is positioned on top of flexible tubing 300 and WWF 290. Concrete is placed and finished on top of the vapor barrier 280 and on and around the flexible tubing 300, WWF 290, and rebar 310 to form slab 260.

Figure 8A:
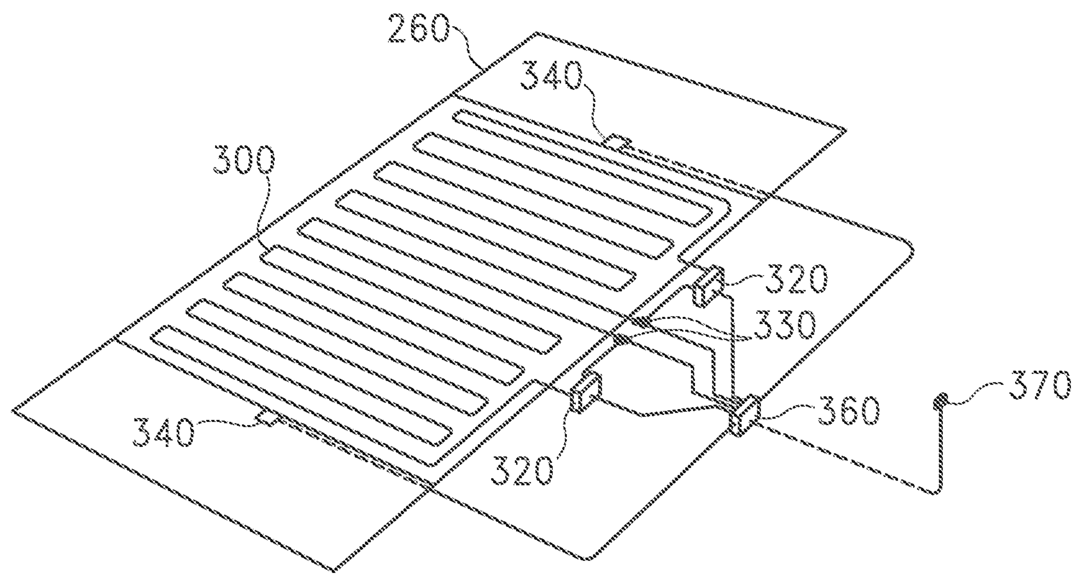
FIG. 8A shows a plan view of the hydronic floor heating system.
Figure 8B:
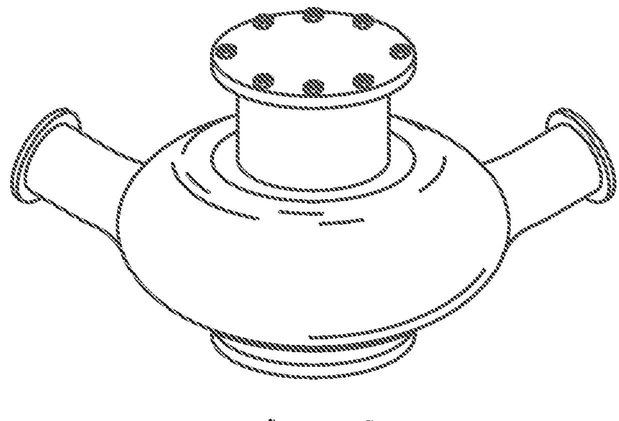
FIG. 8B show a perspective view of a pump.

Referring to FIG. 8, Boilers 320 heat water to pass through flexible tubing 300. Boilers may be electric, gas, or heat exchangers. Circulation pumps 330 pump heated water through flexible tubing 300. Temperature sensors 340 may be positioned throughout slab 260 and are operably connected to a programmable logic control 360—to allow desired heating of the slab 260.

The hydronic fluid flowing through flexible tubing 300 is heated by boilers 320. Alternatively, a heat exchanger may be used instead of boiler 320. Programmable logic control 360 may be used to control the temperature and frequency of heating. Circulation pumps 330 pump the hydronic fluid through the flexible plastic tubing 300. The temperature sensors 340 and programmable control 360 regulate operation of the circulators 330 to meet and maintain an established temperature. This program can be optimized for day/night operation and integrated with psychrometric sensors 370 to monitor physical air properties, inside and outside of the greenhouses, and automate operation. The insulation/vapor barrier 280 slows heat loss in the slab 260 and prevents moisture migration from the slab 260 up to biosolids 30.

The floor heating provides several benefits to the solar-thermal pasteurization process. The hydronic floor heating system (FIG. 8) keeps the biosolids from freezing on the greenhouse floor in cold climates where the solar and psychrometric conditions are otherwise favorable for drying. Additionally, the hydronic floor heating system (FIG. 8) enhances drying at night or when the sun is obscured by heating the biosolids 30 and driving off moisture. Even under optimal drying conditions, the hydronic floor heating system (FIG. 8) enhances drying of biosolids 30 beyond the solar radiant energy by volatilizing moisture and volatile solids out of the biosolids 30. These benefits reduce time that the biosolids 30 must remain in the greenhouses 20, which means more biosolids 30 can be dried per square foot of floor space per hour, using less square footage of greenhouse 20 space for a given volume of biosolids 30. This development to the invention allows operating the inventions as a merchant facility or adopting the inventions at sites with limited square footage or project funding.

One embodiment of the invention provides further utility by using the hydronic floor heating system (FIG. 8) to heat the associated space that adjoins the greenhouses 20, such as where biosolids 30 are mechanically dewatered into the greenhouses, the pasteurization building 50, the control room for the pasteurization unit, any administrative/office space, storage of the finished class A fertilizer, or where enhancement and pelletization occur.

Another embodiment utilizes a heat exchanger and waste heat, renewable gas, or renewable electrical energy from any practical, available sources to pre-heat or fully heat the hydronic fluid. This includes renewable natural gas from a wastewater plant, waste heat or electricity from solid waste incineration, electricity from solar thermal or photovoltaic generation, electricity from hydroelectric or waste heat recovered from the pasteurization system 130.

As an example, one may assume 50,000 wet tons per year throughput. The dewatered biosolids 30 weighs 1,620 lbs. per cubic yard. Trucks deliver biosolids 30 six (6) days per week. In the greenhouse 20, the biosolids 30 may be spread an initial depth of 6 inches. The depth of the biosolids 30 may vary but will affect the rate of drying. Based on the above assumptions of 50,000 wet tons per year multiplied by 2,000 lbs. per ton, 100,000,000 lbs. of biosolids may be introduced each year. That equates to 1,923,076 lbs. per week divided by 1,620 lbs. per cubic yard equals or 1,187 cubic yards per week incoming. 1,187 cubic yards per week divided by 6 days per week equals 197 cubic yards per day incoming.

Using the available square feet capacity of each greenhouse 20 (7,308 multiplied by a 6-inch initial placement depth), 3,654 cubic feet divided by 27 cubic feet per cubic yard equates to 135 cubic yards of capacity per greenhouse 20. Dividing the calculated incoming volume of 197 cubic yards by the single greenhouse 20 capacity of 135 cubic yards, 1.45 greenhouses 20 per day will be required to manage in the design flow. Since there are 14 greenhouses 20, if you divide 14 by 1.45 greenhouses needed per day, it equals 9.6 days of capacity plus one day per week of no incoming biosolids leaving an effective cycle capacity of 10.6 days.

As a further example, one may assume the volume of the biosolids 30 will shrink by 65% because of the greenhouse 20 drying. Biosolids 30 will dry from an average incoming 16% solid to an outgoing (pre-pasteurization) solid content of 65%. Using the incoming volume of about 197 cubic yards per day, multiplied by a shrinkage factor of 65%, about 69 cubic yards of product will be removed from the greenhouses 20 per day, 6 days per week. The bulk density of a cubic yard of biosolids 30 is the same for incoming and outgoing product of the greenhouse 20. This would be 1,620 lbs. per cubic yard. Incoming biosolids 30 to the greenhouses 20 average percent solids of 16% solids. Outgoing biosolids from the greenhouses 20 of 65% solids.

As an example, using 100,000,000 lbs. of incoming biosolids 30, the treatment complex 10 and method anticipates a 65% shrinkage by volume. The 65% shrinkage by volume equates to 65% shrinkage by weight resulting in 65,000,000 lbs. of water evaporated and removed from the greenhouses 20. In turn, 65,000,000 lbs. divided by 365 days a year results in an average of 178,082 lbs. of water removed from the biosolids 30 each day. This moist air would be removed by the exhaust fan 75 into the biofilter system 40 where most of the water would be absorbed into the media bed 60 and evaporated out of the media bed 60 while any vapor that would transition back to water would be collected via the internal perimeter drainage system of the biofilter system 40.

With respect to the pasteurization system processing capacity, the pasteurization system 130 has a heat up belt 150 capacity of 24 feet long by 8 feet wide. Heat up belt 150 brings biosolids 30 up to temperature and then delivers the biosolids 30 to the pasteurization belt 180, which has a capacity of 24 feet long by 8 feet wide. The heat up belt 150 allows for product depth of 3 inches. The pasteurization belt 180 provides for a product depth of 12 inches (biosolids 30 already at a uniform temperature at this point). It takes about eight (8) minutes to raise the average temperature of biosolids 30 from ambient temperature to at least 70° C.

The heat up belt 150 is variable speed controlled. In one embodiment, the heat up belt 150 is set on a 10-minute cycle speed from the time biosolids 30 are deposited on the heat up belt 150 until biosolids 30 reach the far end of the heat up belt 150 loop. The speed may be varied depending on the amount of water in the biosolids 30. The volume of biosolids 30 on the heat up belt 150 cycles about every 10 minutes. Therefore, based on the capacity of the heat up belt 150 (24 feet long multiplied by 8 feet wide multiplied by a 3-inch product depth), about 48 cubic feet of biosolids 30 reach at least 70° C. every 10 minutes. Using 27 cubic feet per cubic yard, this equates to 1.77 cubic yards of biosolids 30 being cycled every 10 minutes.

The pasteurization belt 180 can be set on at least a 30-minute cycle time and can be kept at a minimum temperature zone of at least 70° C. to meet acceptable pasteurization standards of 30 minutes at 70° C. The cycle time may vary depending on climate conditions.

Based on the daily production of 68.95 cubic yards, divided by the processing capacity of 1.77 cubic yards every 10 minutes, the treatment complex 10 permits about 390 minutes of processing per day. With an additional 40 minutes of oven and personnel startup and 40 minutes of shut down time, equates to 470 minutes, divided by 60 minutes an hour, equals 7.82 hours per day of total processing time.

Each of the greenhouse 20 pods has about 754,992 interior cubic feet. There are seven gable roofs with a 4:12 pitch per greenhouse pod 20. The gable area adds an additional 220,206 cubic feet of volume for a total of 975,198 cubic feet of interior air space in each pod. In one embodiment, four exhaust fans 110 associated with each of the seven greenhouses 20 results in 28 fans for each pod (56 total). Exhaust fans 120 may be rated at 7,300 cfm resulting in 204,400 cfm of air being exchanged. This calculates out to about 12,264,000 cubic feet per hour. By dividing 12,264,000 by the total volume of air in the building of 975,198, it results in 12.57 air exchanges per hour. This exchange rate meets the suggested National Fire Protection Association's (NFPA) standards to reduce the possibility of accumulation of combustible vapors for continuously vented areas having exposed biosolids.

One of the key aspects of encouraging the water in biosolids 30 to vaporize into the air is to increase the air flow at the surface of the solids 30. This encouragement is accomplished in three primary ways. First, one mixes the biosolids 30 with the conventional mixing equipment to blend and mix the dryer surface layer of the biosolids with the moist material underneath the surface. Thus, exposing moister product to the surface. Second, the exhaust fans 75 create air movement by exchanging the entire volume of air inside the greenhouses 20 about 12.57 times an hour. Third, one may include ceiling mounted air circulation fans 110 inside the greenhouses 20 to create excessive air movement which will not only aide in the drying process, but it will also circulate the air zones to reduce moisture accumulation on the galvanized steel and its Lexan coverings. This air movement would be accomplished by using six large fans 110 in each pod (12 total) that are rated to move 378,804 cfm. These fans move a total of 2,272,824 cfm per pod. This amount of air movement will rotate and displace the entire air volume in each pod of greenhouses 20 every 26 seconds. This air activity encourages the transition of water into vapor thus accelerating the drying process.

Another key aspect of encouraging the water in biosolids 30 to vaporize into the air is to increase the ambient air temperature of that flowing across the surface of the biosolids 30. The hydronic floor heating system in the slab will heat the biosolids from the bottom of the layer, volatilize water and drive the vapor from the biosolids into the flowing air on top of the layer that has been warmed by the radiant energy of the sun. This warmed air can absorb more moisture than if ambient, open air were flowing across the top of the biosolids, as in the case of open-air drying beds.

The biofilter system 40 reduces odors. In one embodiment, a woodchip/organic-mulch blend 60 is used and allows for maximum porosity while still maintaining acceptable humus to support microbial population. The porosity is important to reduce the potential for pressure drop throughout the life of the media. Pressure tests on our outbound air of our existing biofilter systems 40 can be used to indicate when the media 60 may be approaching the need to be refreshed. The primary design criteria used for the size of the biofilter 40 is based on the Empty Bed Contact Time (EBCT). This calculation is the amount of time that the exhaust air is in contact with the media. In one embodiment, the minimum EBCT for removing the odors from this design is about 7 seconds. In one embodiment, the biofilter 40 for each pod will have a footprint of 294 feet long by 40 feet wide with a media depth of 3 feet. This equates to a biofilter media volume of 35,280 cubic feet. The air volume exhausted by the exhaust fans was 204,400 cfm. If you divide the cfm's by 60 seconds equates it to 3,406 cubic feet per second. To determine the EBCT, one divides the cubic feet of media of 35,280 by the air flow of 3,406 cubic feet per second to result in an EBCT for this design of 10.35 seconds of retention time.

Recommended moisture contents for biofilters range from 40% to 65%. During warmer and dryer months, additional moisture may be added to maintain these levels. Generally, this addition is accomplished using sprinklers or soakers located on top of the media. This approach typically has difficulty penetrating through the biosolids 30 as the exhaust air is forcing against the sprinkler water flow. With the design of the greenhouses 20 and the fact that air that has absorbed moisture from the drying process is exhausted, the ability of the media to maintain the desired moisture content is improved.

Figure 9:
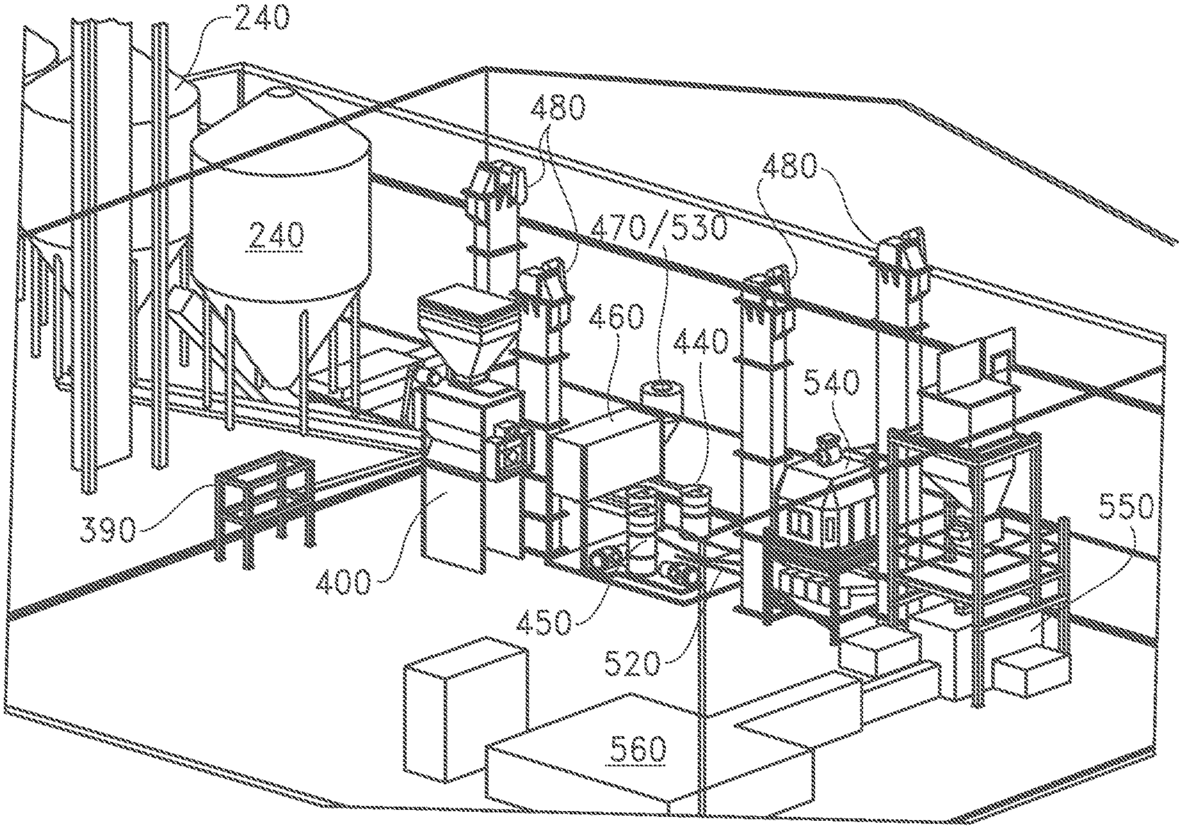
FIG. 9 shows a perspective view of the pelletizing apparatus.
Figure 10:
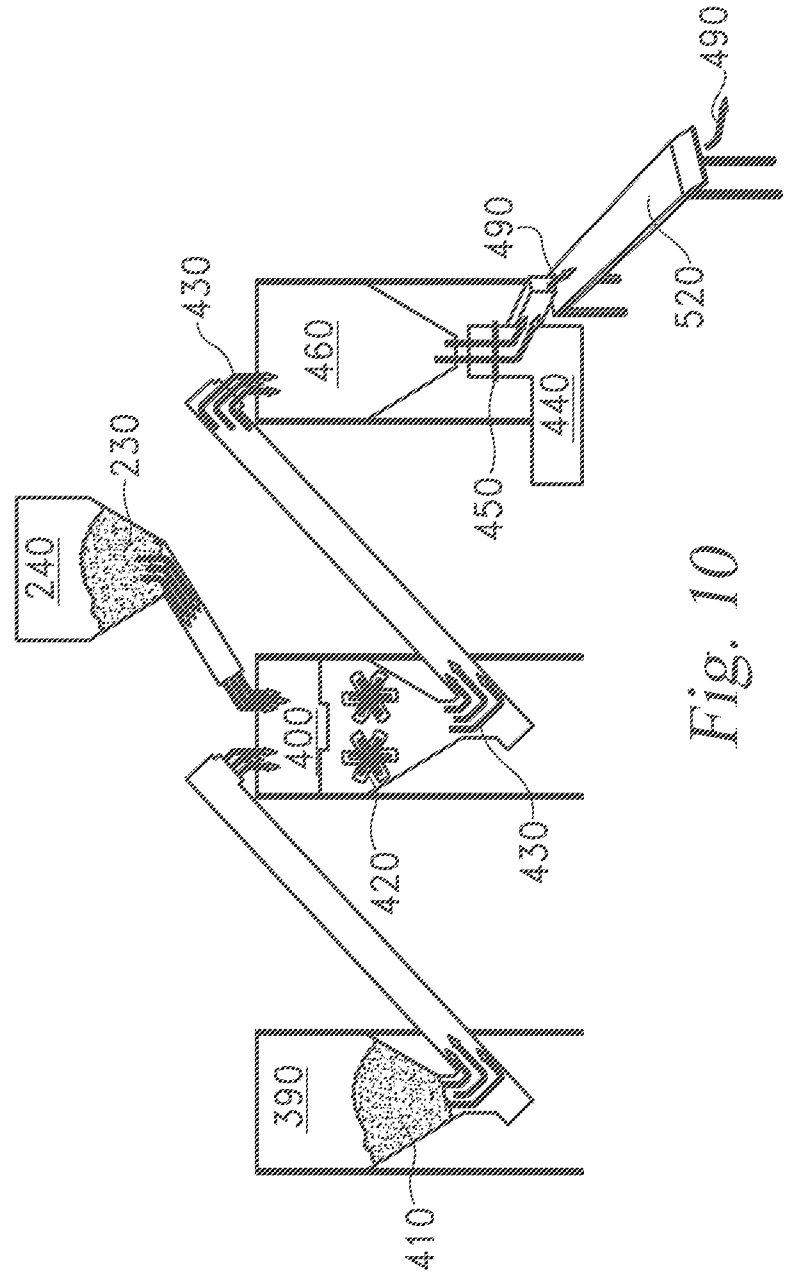
FIG. 10 shows a schematic of the pelletizing apparatus.

Referring to FIGS. 9 and 10, Holding tanks 240 hold the pasteurized biosolids 230. Enhancement storage 390 may contain enhancements 410 such as synthetic fertilizers, potash, pesticides (which includes herbicides, insecticides, or fungicides), organics (including animal manures, plant products or algae), binders, or time release/dust control agents. A scale/blender unit 400 is operably connected to holding tanks 240 and enhancement storage 390. The scale/blender unit 400 weighs and proportions the biosolids 230 and enhancements 410. Mixers 420 homogenize and blend the pasteurized biosolids 230 with one or more of the enhancements 410 and deliver the blended fertilizer 430 to a pellet mill 440. The pellet mill 440 comprises a die 450 that may be a flat or ring die with rollers for milling and compressing the blended fertilizer 430 through the die 450.

Figure 11:
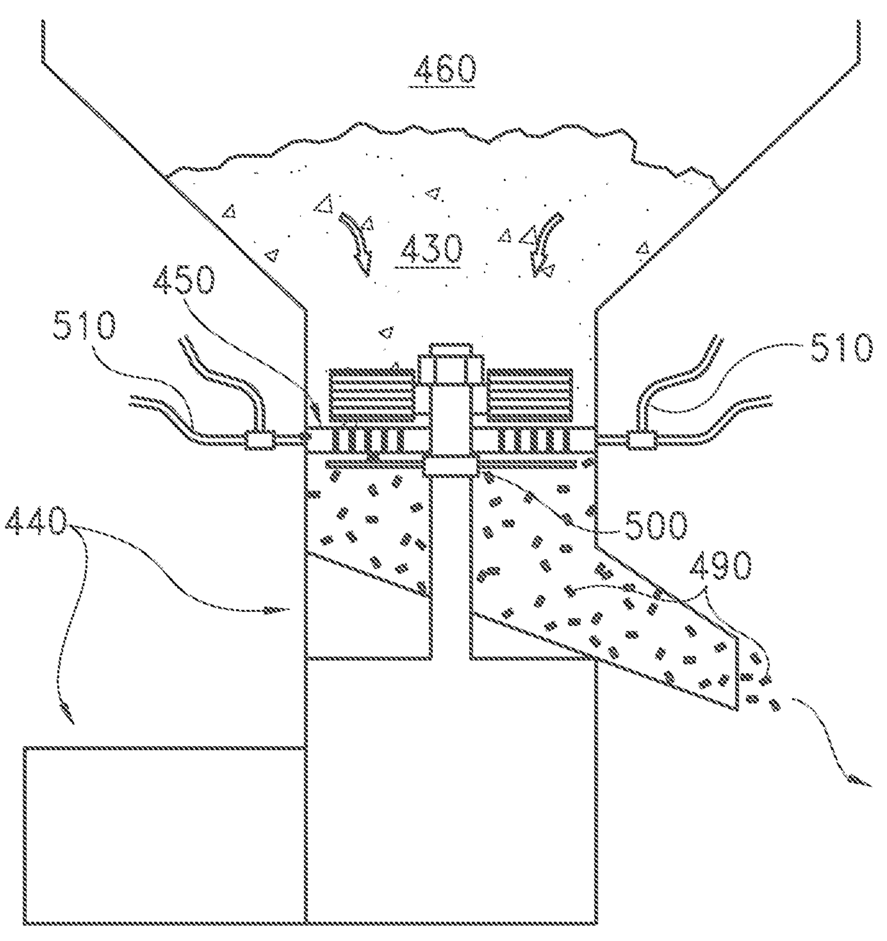
FIG. 11 shows a cross section of a pellet mill.

Referring to FIGS. 9, 10 & 11, the pellet mill 440 comprises a hopper 460 and dust control system 470, operably connected to the scale/blender 400 via bucket elevator 480. The pellet mill 440 compresses the blended fertilizer 430 through the die 450, heats the blended fertilizer 430 to approximately 65-93° C. which activates the naturally occurring lignin that in turn promotes the formation of cylindrical pellets 490. The pellet mill 440 cuts pellets 490 to a desired length by knives 500 as it leaves the die 450. A die temperature control 510, such as a hydronic, oil, refrigerant, or compressed air heating/cooling system, may be used to regulate the temperature of the die 450 to optimal levels.

A shaker table 520 may be used to separate dust and out of specification pellets 490 and return them to the initial system for reprocessing. A dust control system 470 operably connected to the shaker table 520 and mill 440 captures dust to be returned to the system via ducting. A cooler 540 is operably connected to the pellet mill 440 and the shaker table 520 via bucket elevator 480 or conveyance, to remove heat from the pellets 490. This cooling also helps to solidify the lignin, thereby hardening the pellet 490 to promote the forming of a protective shell. This increases pellet durability through packaging, distribution, and final broadcasting at the target site.

An automated bagging system 550 is operably connected to the cooler 540 using a bucket elevator or conveyance to weigh and bag the finished pellets 490. The fertilizer pellets 490 are packaged into plastic, paper, or other bagging materials. The dust control system 470 can be operably connected to the automated bagging system 550 to collect any remaining dust and return it to the system 10. The sealed bags are then conveyed to a robotic stacker 560. The robotic bag stacker 560 stacks the bags on pallets or skids. The pallets or skids can then be placed into a pallet wrapper where the stacked bags are wrapped and protected for storage or shipping. Alternatively, bags may be hand-stacked. A control system (not shown) capable of starting and stopping the conveyance and equipment 480, assists and controls the flow rates and batch timing for the entire enhancement/pelletization process.

Alternatively, the pellets could be bulk loaded into a truck trailer via conveyor before the bagging operation to distribute pellets in a bulk format.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

What is claimed is:

1. A system, comprising;

at least one greenhouse for receiving and pre-drying biosolids, wherein the greenhouse comprises a hydronic floor heating system integrated into a reinforced concrete slab operatively configured with a vapor barrier and an odor control system, at least one pasteurization building operably connected to the at least one greenhouse to receive the biosolids through an inlet, the at least one pasteurization building comprising at least one pasteurization system, the at least one pasteurization system comprising at least one heat up belt, a burner fan to heat a gas that passes through the heat up belt and the biosolids, wherein the burner fan heats the biosolids to at least 70° C., at least one pasteurization belt operably connected to the at least one heat up belt, wherein the at least one pasteurization belt conveys the biosolids through at least one pasteurization chamber wherein the at least one pasteurization chamber maintains the temperature of the biosolids at least at 70° C. for at least 30 minutes;

a pit/conveyor and bucket elevator for receiving and elevating class A biosolids into one or more holding tanks from a first source;

the one or more holding tanks operably connected to a scale and blender unit by way of one or more second conveyors;

one or more storage tanks for holding one or more enhancements operably connected to the scale/blender unit;

wherein the scale/blender unit weighs and proportions the biosolids and enhancements and homogenizes a resulting blended mixture;

one or more pellet mills, each of which comprising at least one flat die, at least one roller, at least one hopper, and at least one dust control system, operably connected to the scale/blender, wherein the one or more pellet mills mill and compress the blended mixture through at least one flat die, heating the blended mixture to approximately 65-93° C. to activate the lignin and form a pellet, the pellet mill then cuts the hardened blended mixture to one or more desired lengths using one or more knives as the blended mixture leaves the bottom of the die;

a hydronic, oil, refrigerant or compressed air heating/cooling system piped through the die to regulate the temperature of the die;

a shaker table to separate dust and off spec pellets and return them to the system for reprocessing;

the at least one dust control system operably connected to the shaker table and the pellet mill for capture of dust and return to the system;

a cooler, operably connected to the pellet mill and the shaker table to remove heat from the pellets and solidify the lignin thereby hardening the pellet and forming a shell;

an automated bagging system, operably connected to the cooler via the bucket elevator, to weigh and batch fertilizer pellets into plastic bags and convey them to a robotic stacker, also operably connected to the dust control system to return dust to the system;

a robotic bag stacker that stacks bags on pallets on pallet wrappers;

a plurality of pallet wrappers for wrapping; and a variable logic control system that automates starting and stopping of conveyance and equipment and controls flow rates and batch timing.

2. The system of claim 1 wherein the heat up belt and the pasteurization belt are controlled by a programmable logic control.

3. The system of claim 1 wherein the enhancements comprise one or more of synthetic fertilizers, potash, pesticide, organics, binders, time release agents, or dust control agents.

4. The system of claim 1 further comprising a shaker table operably connected to the pellet mill to separate non-conforming pellets and dust from acceptable pellets.

5. The system of claim 1 wherein the at least one greenhouse comprises a plurality of exhaust fans operable to exchange air in the at least one greenhouse.

6. A system for pasteurizing biosolids comprising;

at least one greenhouse for receiving and pre-drying biosolids, wherein the greenhouse comprises a hydronic floor heating system integrated into a reinforced concrete slab operatively configured with a vapor barrier and an odor control system, at least one pasteurization building operably connected to the at least one greenhouse to receive the biosolids through an inlet, the at least one pasteurization building comprising at least one pasteurization system, the at least one pasteurization system comprising at least one heat up belt, a burner fan to heat a gas that passes through the heat up belt and the biosolids, wherein the burner fan heats the biosolids to at least 70° C., at least one pasteurization belt operably connected to the at least one heat up belt, wherein the at least one pasteurization belt conveys the biosolids through at least one pasteurization chamber wherein the at least one pasteurization chamber maintains the temperature of the biosolids at least at 70° C. for at least 30 minutes;

at least one holding tank operably connected to the at least one pasteurization chamber, wherein the at least one holding tank receives pasteurized biosolids as they leave the pasteurization chamber;

at least one enhancement storage to hold one or more enhancements, wherein the at least one enhancement storage is operably connected to the at least one holding tank to deliver enhancements to the biosolids;

a scale operably connected with the at least one holding tank and the at least one enhancement storage to combine the biosolids and the one or more enhancements, a blender operably connected with the scale to blend the biosolids with the one or more enhancements, and a pellet mill operably connected to the blender to receive a blended fertilizer comprising the biosolids combined with the at least one enhancement, the pellet mill comprising a temperature controlled die to form the blended fertilizer into a pellet and a knife to cut the pellet to a desired length.

7. The system of claim 6 wherein the heat up belt and the pasteurization belt are controlled by a programmable logic control.

8. The system of claim 6 wherein the enhancements comprise one or more of synthetic fertilizers, potash, pesticide, organics, binders, time release agents, or dust control agents.

9. The system of claim 6 further comprising a shaker table operably connected to the pellet mill to separate non-conforming pellets and dust from acceptable pellets.

10. The system of claim 6 further comprising an automated bagging system to deposit the pellets into a plurality of bags.

11. The system of claim 6 further comprising a robotic stacker to position a plurality of bags on a shipping structure.

12. The system of claim 6 wherein the at least one greenhouse comprises a plurality of exhaust fans operable to exchange air in the at least one greenhouse.

13. The system of claim 6 wherein the one or more pellet mills comprise at least one flat die, at least one roller, at least one hopper, and at least one dust control system, operably connected to the scale/blender, wherein the one or more pellet mills mill and compress the blended mixture through the at least one flat die, heating the blended mixture to approximately 65° C. to about 93° C. to activate the lignin and form a pellet.

14. The system of claim 6 wherein the odor control system comprises a biofilter.

15. A system for pasteurizing biosolids comprising at least one greenhouse for pre-drying biosolids, wherein the greenhouse comprises a clear roof, a heat-controlled floor system, a vapor barrier, and an odor control system, at least one pasteurization unit configured to receive biosolids from the greenhouse, the pasteurization unit comprising a perforated belt conveyor and a burner fan configured to direct heated gas through the biosolids until the biosolids reach a temperature of at least about 70° C. for at least about 30 minutes, a holding tank operably connected to the pasteurization unit to receive pasteurized biosolids, an enhancement storage to hold one or more enhancements, the enhancement storage operably connected to the holding tank to deliver enhancements to the biosolids, a blender to receive pasteurized biosolids from the holding tank and to receive enhancements from the enhancement storage, the blender comprises a scale to determine dosing of enhancements and to mix the biosolids and the enhancements into blended fertilizer, and a pellet mill to receive the blended fertilizer from the blender, the pellet mill comprising a die to form the blended fertilizer into a plurality of pellets, a temperature regulator to maintain the blended fertilizer at an optimum temperature to form the pellets, and a cutting knife.

16. The system of claim 15, wherein the greenhouse further comprises a humidity control system.

17. The system of claim 15, wherein the odor control system comprises activated carbon filtration.

18. The system of claim 15, wherein the blender scale determines enhancement dosing based on biosolid weight.

19. The system of claim 15, wherein the enhancements comprise one or more synthetic fertilizers, potash, pesticide, organics, binders, time release agents, or dust control agents.

20. The system of claim 15, wherein the burner fan is configured to deliver heated air at a controlled flow rate across the biosolids.

* * * * *